Patented May 5, 1942

2,281,919

UNITED STATES PATENT OFFICE 2,281,919

CRACKING OIL USING SYNTHETIC CATALYTIC COMPOSITIONS

Gerald C. Connolly, Baton Rouge, La., assignor to Standard Oil Development Company, a corporation of Delaware No Drawing. Application December 6, 1938, Serial No. 244,180

6 Claims. (Cl. 196—52)

This invention deals with the use of superior activated synthetic gel catalysts and especially to the use of such catalysts for the catalytic cracking of hydrocarbons such as those occurring in petroleum. More particularly, this invention relates to the use of certain elements of group II of the periodic table, for improving the catalytic cracking activity of various synthetic gel catalytic masses.

Certain metal compounds such as silica and alumina have the property of existing in the hydrogel form, which, upon drying, yields a very porous mass (dried gel) of high catalytic activity. These hydrogels are generally prepared by allowing a hydrosol to "set" until a considerable portion of the reaction liquid is imbibed by some sort of colloidal structural arrangement. Two different hydrogels may be intimately mixed to obtain a mechanical mixture (mixed gel), which upon drying, may have superior properties over either one of the individual constituents. Plural hydrogels are obtained by allowing a mixed hydrosol of different metal compounds to "set." Impregnated gels may be prepared by soaking washed hydrogels in different salt solutions so that the latter are completely dispersed throughout the mass. Gelatinous precipitates differ from hydrogels by the fact that they separate from the liquor as a slimy fluid jelly in a separate phase leaving some supernatant liquid above. A heterogeneous gel, on the other hand, is a gelatinous precipitate dispersed in a hydrosol and allowed to "set" or "gel."

For the purposes of this invention, the term "hydrous oxide jelly" will be employed to designate all gels other than those in the dried form which no longer possess the flexible characteristics attributable to gels containing appreciable amounts of imbibed water.

For example, a hydrosol of silica may be prepared by mixing equal volumes of 25° Bé. sodium silicate solution and 23° Bé. sulfuric acid solution. In 3–5 hours, the hydrosol sets to a silica hydrogel, imbibing all of the reaction liquids. The hydrogel may be broken up, washed free of reaction salts, formed if desired and dried. Hydrous alumina hydrogel may be prepared by mixing with stirring, a solution of 10 kg. of

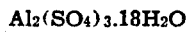

dissolved in 100 liters of water with 100 liters of 1 N NH$_4$OH, and washing by decantation with distilled water. A mechanical mixture of the two hydrogels is obtained by intimate mixing of the two washed hydrogels.

Plural hydrogels of silica and alumina in the ratio of 12:1 may be prepared by adding a volume of 23° Bé. sulfuric acid solution containing aluminum sulfate equivalent to one mole of Al$_2$O$_3$, to an equal volume of 25° Bé. sodium silicate solution. After the hydrogel has set, it is washed with distilled water.

Impregnated gels having molal ratios of about 12 SiO$_2$:1 Al$_2$O$_3$ are prepared by soaking washed silica hydrogel overnight in a 30% solution of Al(NO$_3$)$_3$.9H$_2$O, draining, drying, and decomposing the aluminum nitrate by heat. These dried products of hydrogels which no longer retain their spongy characteristics are known as dried gels.

The present invention is specifically concerned with the use of dried gel catalysts containing small amounts of the non-volatile right-hand elements of group II of the periodic table, preferably those having an atomic weight of below 150, namely, beryllium, magnesium, cadmium and cerium. The elements of group II herein described and claimed have reference to Hubbard's "Periodic Chart of the Atoms" published by M. W. Welch Mfg. Co., 1515 Sedwick St., Chicago, Ill., revised in 1935. These elements, added preferably in the form of their water soluble salts, may be incorporated in the hydrosol or heterogeneous gel or employed as a mixed hydrous gel or used for impregnating hydrous or dried gels. The amount of these elements added to these catalysts is very small, preferably not over about 0.5% to 1%, since it has been found that higher amounts detrimentally affect the activity of the gel catalyst. Although silica-alumina gels are preferred as base stocks, the invention is not limited to using this material but is applicable to other hydrous oxide gels possessing some catalytic activity.

In the preferred procedure, it is desirable to employ co-impregnated silica hydrogels obtained by soaking the purified silica hydrogel produced in known manner in a mixed solution of a soluble aluminum salt such as aluminum nitrate, and a soluble salt (usually the ammonium salt or the nitrate) of the metal promoter desired. The resulting product is drained, dried, decomposed by heating, and ground or formed, if desired.

It has been found that although alumina-silica gels are fairly active catalysts for cracking reactions, their cracking activity can be appreciably improved by the addition of small amounts of these promoters, which comprise salts of beryllium, magnesium, cadmium, cerium, or mixtures thereof.

The invention can be more clearly understood by reference to the following examples, which, however, are not intended to limit the invention in any respect:

*Example 1.*—A purified silica hydrogel was prepared and impregnated with aluminum nitrate so that the dried gel produced contained about 12.5% of alumina. This gel had a density of 0.600 and was employed for the cracking of West Texas gas oil of 33.8 A. P. I. gravity for a period of 2 hours at a temperature of 855° F., and a feed rate of 0.615 vol./vol./hr. The amount of gasoline obtained was 50% by volume. The liquid product had an A. P. I. gravity of 46.9 and the rejected gas obtained amounted to 11.6 liters per hundred grams of liquid product, the gas density being 0.98.

*Example 2.*—The same silica hydrogel as that described in Example 1 was impregnated with a mixture of aluminum nitrate and beryllium nitrate so that the resulting dried gel contained about 12.5% $Al_2O_3$ and 0.1% BeO. The apparent density of the final catalyst was 0.646, and when subjected to the cracking conditions disclosed in Example 1, it gave a gasoline yield of 55%. The gasoline had an A. P. I. gravity of 48.9, and the amount of rejected gas produced was 11.3 liters per hundred grams of liquid product, the density of the gas being 0.78. It can be seen that the addition of the small amount of beryllium appreciably raised the yield of gasoline produced in the cracking operation.

*Example 3.*—A catalyst was prepared as in Example 2, but the final dried gel contained 12.5% $Al_2O_3$ and 5% BeO. The apparent density of this catalyst was 0.610. The gasoline yield in this case was 48.5%, which is appreciably lower than the yield obtained without the promoter as given in Example 1.

*Example 4.*—A co-impregnated silica gel was prepared as in Example 2, except that a magnesium salt was employed instead of a beryllium salt. The dried gel contained 12.5% $Al_2O_3$ and 0.1% MgO. Upon cracking under conditions such as those described in Example 1, a 53% yield of gasoline was obtained, the gravity of the liquid product being 49.4 A. P. I. It will be observed that this yield is higher than that obtained in Example 1, when no promoter was employed.

*Example 5.*—In this case a catalyst was prepared as in Example 4, but the dried gel analyzed 12.5% $Al_2O_3$ and 1.5% MgO. The apparent density of the dried gel was 0.638 and the yield of gasoline obtained was 48.0%, showing that the additional amount of promoter effected on appreciable loss in activity.

*Example 6.*—The catalyst was prepared in accordance with the directions given in Example 4, except that the dried gel in this case contained 5.0% MgO and 12.5% $Al_2O_3$. With this catalyst the yield of gasoline was only 40%, showing that further addition of promoter decreased considerably the activity of the catalytic mass.

*Example 7.*—A co-impregnated silica gel was prepared as in Example 2, except that a cadmium salt was employed instead of a beryllium salt. The dried gel contained 12.5% $Al_2O_3$ and 0.1% CdO, the apparent density of the catalyst being 0.602. Upon cracking under conditions such as those described in Example 1, a 55% yield of gasoline was obtained, the A. P. I. gravity of the liquid product being 49.0. This yield is appreciably higher than that obtained with the unimpregnated gel given in Example 1.

*Example 8.*—A silica gel catalyst was prepared as in Example 7, except that the catalyst contained 1.5% CdO instead of 0.1%, and the apparent density was 0.622. With this catalyst cracking under the same conditions as in Example 1 resulted in a gasoline yield of only 43%, showing a considerable drop in yield due to the additional amounts of the cadmium salt.

*Example 9.*—This catalyst was prepared as in Example 7, except that the CdO content was 5.0%, and the apparent density was 0.170. In this case the gasoline yield was only 25.5%, showing that a considerable loss in activity was effected by the further addition of the cadmium salt.

*Example 10.*—The catalyst in this example was prepared in the same manner as that described in Example 2, with the exception that a cerium salt was employed instead of a beryllium salt. The apparent density of the catalyst was 0.619 and, besides 12.5% $Al_2O_3$, it contained 0.1% $Ce_2O_3$. Using this catalyst for the cracking operation, a gasoline yield of 58% was obtained, showing a considerable increase in activity over the unpromoted catalyst described in Example 1.

*Example 11.*—Here the catalyst was similar to that in Example 10 with the exception that the $Ce_2O_3$ content was 1.5%. The gasoline yield with this catalyst was 51.5% showing an appreciable decrease due to the additional amount of promoter.

*Example 12.*—Another catalyst was prepared as in Example 10, except that the $Ce_2O_3$ content was 5% and the apparent density was 0.660. With this catalyst the gasoline yield was reduced to 49%, showing that further addition of promoter inactivated the catalyst.

Although these catalysts operate most satisfactorily when employed for cracking operations, especially in the cracking of petroleum hydrocarbons, they may be advantageously employed for catalyzing other reactions such as dehydrogenation, alkylation, isomerization, aromatization, polymerization and the like.

Various modifications may be made within the scope of the present disclosure, and the invention is not limited to any particular examples or theory of operation, but only by the following claims in which it is intended to cover the invention as broadly as the prior art permits.

I claim:

1. A process for cracking hydrocarbon oil to form lower boiling hydrocarbons suitable for motor fuel which comprises contacting said oil at cracking temperature with a catalyst comprising a composite gel of silica and alumina containing a small amount but not more than 1% of an oxide of an element of group II taken from the class consisting of beryllium, magnesium, and cadmium and maintaining said oil in contact with said catalyst for a period sufficient to obtain the desired cracking thereof.

2. The invention defined in claim 1 wherein the oxide of the element of group II consists of beryllium oxide.

3. The invention defined in claim 1 wherein the oxide of the element of group II consists of cadmium oxide.

4. The invention defined in claim 1 wherein the oxide of the element of group II consists of magnesium oxide.

5. A process for cracking hydrocarbon oils to form lower boiling hydrocarbons suitable for motor fuel which comprises contacting said oil at cracking temperature with a catalyst comprising a composite gel of silica and alumina formed by impregnating a hydrous oxide of silica with a decomposable salt of aluminum and thereafter decomposing said salt, said composite gel containing a small amount but not more than 1% of an oxide of the elements of group II of the periodic system taken from the class consisting of beryllium, magnesium and cadmium and maintaining said oil in contact with said caatlyst for a period sufficient to obtain the desired cracking thereof.

6. A process for cracking hydrocarbon oil to form lower boiling hydrocarbons suitable for motor fuel which comprises contacting said oil at cracking temperature with a catalyst comprising a composite gel of silica and alumina containing a small amount but not more than 1% of an oxide of an element of group II of the periodic system taken from the class consisting of beryllium, magnesium, and cadmium, said composite gel formed by impregnating a hydrous oxide of silica with a solution containing a decomposable salt of aluminum and said group II element and thereafter decomposing said salts and maintaining said oil in contact with said catalyst for a period sufficient to obtain the desired cracking thereof.

GERALD C. CONNOLLY.